(12) United States Patent
Wallin

(10) Patent No.: US 7,889,363 B2
(45) Date of Patent: Feb. 15, 2011

(54) COLOR LASER PRINTER FOR PRINTING PRISMATIC DUO-TONE COPY-RESISTANT BACKGROUNDS

(75) Inventor: Peter Eric Wallin, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1048 days.

(21) Appl. No.: 11/565,682

(22) Filed: Dec. 1, 2006

(65) Prior Publication Data

US 2008/0130034 A1 Jun. 5, 2008

(51) Int. Cl.
*G06K 1/00* (2006.01)
(52) U.S. Cl. ................ 358/1.13; 358/1.15; 358/3.28
(58) Field of Classification Search ........... 358/1.1, 358/1.2, 1.13–1.15, 1.18, 3.14, 3.28; 382/100; 347/37, 40, 104; 235/380, 494
See application file for complete search history.

(56) References Cited

U.S. PATENT DOCUMENTS

| 6,515,755 | B1 * | 2/2003 | Hasegawa | 358/1.14 |
| 6,765,688 | B1 * | 7/2004 | Claiborne | 358/1.18 |
| 6,896,354 | B1 * | 5/2005 | Uchisako et al. | 347/37 |
| 6,997,550 | B2 * | 2/2006 | Uchisako et al. | 347/104 |
| 7,079,267 | B2 * | 7/2006 | Umeda et al. | 358/1.14 |
| 7,196,804 | B2 * | 3/2007 | Yamazaki et al. | 358/1.15 |
| 7,384,890 | B2 * | 6/2008 | Lubrino et al. | 503/204 |
| 7,483,175 | B2 * | 1/2009 | Ryan et al. | 358/1.9 |
| 2003/0062421 | A1 * | 4/2003 | Bloomberg et al. | 235/494 |
| 2004/0080777 | A1 * | 4/2004 | Smith | 358/1.14 |
| 2005/0007413 | A1 * | 1/2005 | Uchisako et al. | 347/40 |
| 2006/0192991 | A1 * | 8/2006 | Donahoe et al. | 358/1.15 |
| 2007/0247667 | A1 * | 10/2007 | Mori | 358/1.18 |
| 2008/0019746 | A1 * | 1/2008 | Takiyama et al. | 399/366 |
| 2008/0128493 | A1 * | 6/2008 | Jones et al. | 235/380 |
| 2009/0244641 | A1 * | 10/2009 | Wu | 358/3.28 |
| 2010/0067057 | A1 * | 3/2010 | Guo et al. | 358/3.06 |

OTHER PUBLICATIONS http://www.abnotena.com; "ABnote North America Introduces DuoChrome Ink", Feb. 17, 2010.*

* cited by examiner

*Primary Examiner*—Kimberly A Williams

(57) ABSTRACT

An improved printing apparatus and method for its use is provided for printing copy-resistant prismatic, duo-tone patterns as a background on print media. A user or systems administrator can create a copy-resistant background design and store it as a background data file for later use, either on his or her personal computer, or at a secure network server. An authorized user can then create user-defined foreground data to be printed along with the copy-resistant background data, in a single printing operation, using a single printer, and using "blank" print media, such as standard "plain" copy paper. Highly secure documents, such as cashier's checks, thus could be printed in a single print job, without having to purchase and securely store pre-printed check paper.

25 Claims, 7 Drawing Sheets

COLOR LASER PRINTER FOR PRINTING PRISMATIC DUO-TONE COPY-RESISTANT BACKGROUNDS

TECHNICAL FIELD

The present invention relates generally to image forming equipment and is particularly directed to an EP printer of the type which prints prismatic, duo-tone patterns as a background on print media. The invention is specifically disclosed as a color laser printer that can print copy-resistant background images and user-defined foreground print images on a blank sheet of print media, all in a single print job.

BACKGROUND OF THE INVENTION

There are many existing techniques used for creating documents that are copy- and tamper-resistant. Owners of such documents want to be able to verify that a particular document is an original and has not been copied or altered in any way. Typical examples of such documents are bank cashier's checks, stock certificates, birth certificates, and college transcripts.

One of the "security techniques" used to create such documents is to print a background that consists of two interlaced prismatic patterns of blue and reel ink. These patterns involve very fine lines and color gradients which do not copy or scan well, and a copied document typically will easily be distinguished from an original. Typically this type of printing application requires specialty paper that must be ordered and then securely stored. This paper is then run through a traditional monochrome laser printer to add variable text, such as the data on a printed check.

The specialty paper in many conventional processes is created using an offset printing press, and requires large quantities to be purchased at one time to obtain a lower price. Even in high quantities, this type of paper can be very expensive, in excess of $1.00 per sheet. It should be noted that the security paper industry currently has approximately $3 billion in annual revenue.

Since this is very specialized paper, a security problem is created in that the paper must be stored and accounted for in a manner such that it can not be easily stolen. This requires both inventory space and resources in the security storage area.

FIG. 7 depicts a typical offset printing press in a diagrammatic view, showing the cross-section of the rollers. There are ink rollers that apply ink in a specific manner to a plate cylinder. There are also water rollers that also apply liquid to the plate cylinder. There is an offset cylinder that receives these materials from the plate cylinder and beneath the offset cylinder is an impression cylinder. A nip is created between the offset cylinder and impression cylinder, and the blank paper is sent through the nip and then printed with the duo-tone prismatic pattern.

As can be seen, the "security pattern" created by the plate cylinder is not easily changed using the offset print process. Therefore, it is typical to use the same duo-tone prismatic pattern for a large quantity of paper, to reduce the printing cost. If a pattern is to be changed, then the plate cylinder itself must be changed to accommodate the new pattern. Certainly an individual user or department of most companies could not command a specialized background strictly for that sole user or department.

SUMMARY OF THE INVENTION

It is an advantage of the present invention to provide a methodology that allows a master duo-tone pattern to be created and used as a background image with user-specified foreground data, and for the entire document to be printed on plain paper at a single printer.

It is another advantage of the present invention to provide a methodology in which a copy-resistant duo-tone background can be created on demand, using "plain paper" only, as a secure document is needed by a user.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an image forming apparatus is provided, which comprises: an input/output circuit; an interface circuit; a print media input device; a print engine that applies image-forming material to print media at an image-forming station, and an output pathway that directs the print media to an output area; wherein: (a) the input/output circuit receives a print job that contains digital image data; (b) the interface circuit contains input and output devices that are configured: (i) to move a sheet of print media from the print media input device to the print engine which applies the image-forming material to a surface of the sheet at the image-forming station; and (ii) to move the sheet through the output pathway; (c) the digital image data includes, for at least one sheet of blank print media for the print job, both: (i) user-defined print data as foreground data, and (ii) predetermined copy-resistant background data: and (d) the print engine applies, to the at least one sheet of blank print media, both the foreground data and the background data during the same print job in real time.

In accordance with another aspect of the present invention, an image forming apparatus is provided, which comprises: an input/output circuit; a print media interface circuit; a print media input device; a print engine that applies image-forming material to print media at an image-forming station; an output pathway that directs the print media to an output area; a processing circuit that communicates signals to and from the interface circuit, and to and from the print engine; and a memory circuit that stores data used by the processing circuit; wherein: (a) the input/output circuit receives a print job that contains digital image data; (b) the print media interface circuit moves the print media from the print media input device to the print engine, and after passing through the print engine, moves the print media through the output pathway; (c) the print engine, according to the digital image data, applies the image-forming material to a surface of the print media at the image-forming station; (d) the processing circuit is configured to provide data signals to the print engine, including the digital image data, wherein the digital image data includes both; (i) user-defined print data as foreground data, and (ii) predetermined copy-resistant background data; and (e) the print engine applies both the foreground data and the background data during the same print job in real time.

In accordance with yet another aspect of the present invention, a method for printing a copy-resistant print media is provided, in which the method comprises the following steps: (a) providing an image forming apparatus having a print engine that applies image-forming material to blank print media; (b) creating predetermined copy-resistant background data; (c) creating user-defined foreground data; and (d) causing the image forming apparatus to operate, wherein the copy-resistant background data and the user-defined foreground data are combined into a single print processing operation that is printed in real time on the blank print media, which thereby becomes copy-resistant print media.

In accordance with still another aspect of the present invention, a method for creating a plurality of copy-resistant printed documents, using blank print media is provided, in which the method comprises the following steps: (a) providing blank print media that is not stored in a secure location; (b) providing a printing apparatus, and loading it with the blank print media; (c) creating predetermined copy-resistant background data; (d) creating user-defined foreground data; and (e) sending a print job to the printing apparatus, wherein the copy-resistant background data and the user-defined foreground data are combined into a single print processing operation and printed in real time during a single printing event, which thereby produces at least one sheet of the print media that is copy-resistant.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENTS

Reference will now be made in detail to the present preferred embodiment of the invention, an example of which is illustrated in the accompanying drawings, wherein like numerals indicate the same elements throughout the views.

Figure 1:
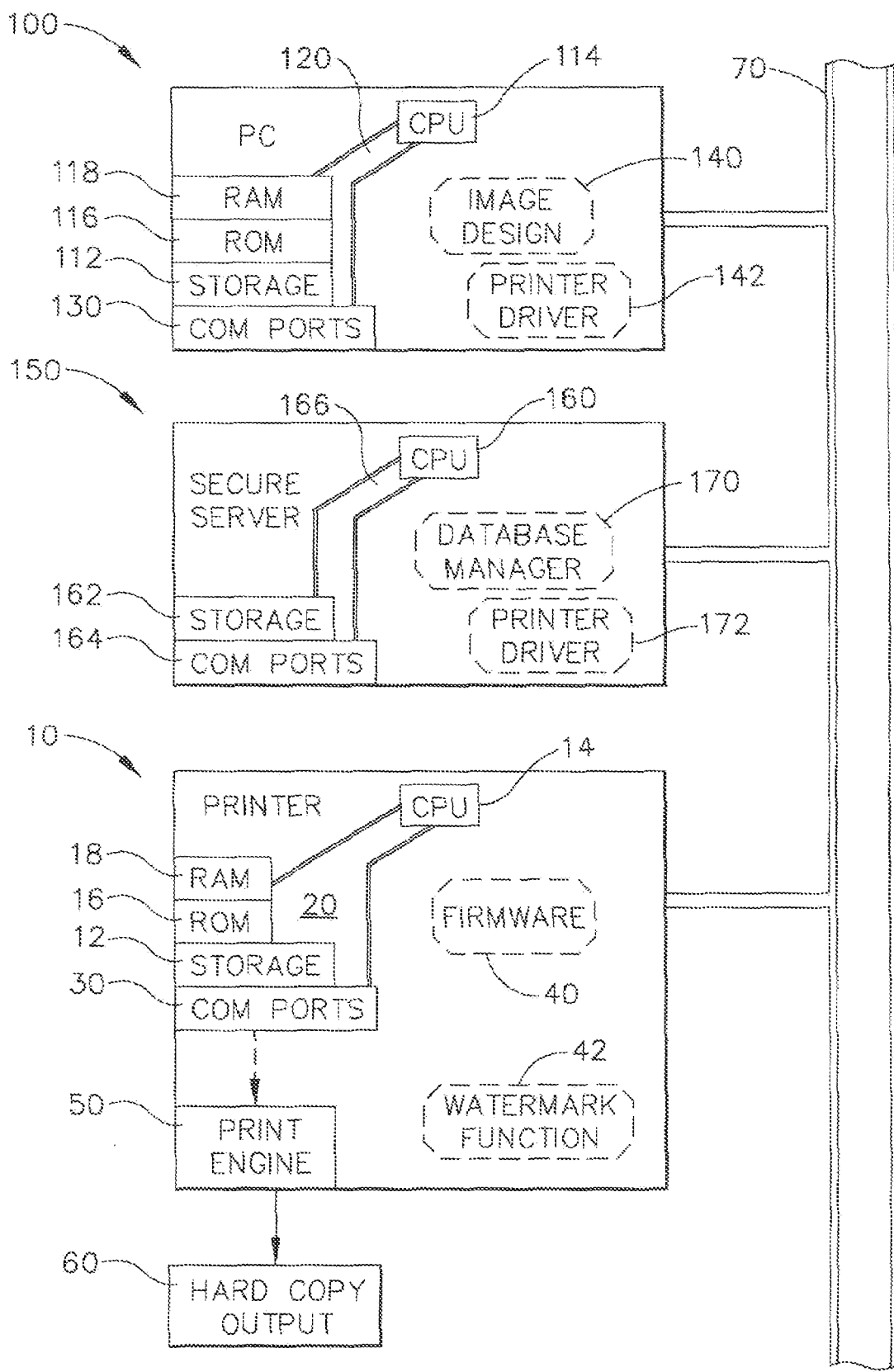
FIG. 1 is a block diagram of the major components of a networked printer system, as constructed according to the principles of the present invention.

Referring now to the drawings, FIG. 1 is a hardware block diagram generally showing some of the main components of an electrophotographic (EP) printer 10, a personal computer 100, and a network server 150, all connected over a computer network 70. EP Printer 10 contains an electrical power supply, which typically receives AC voltage and outputs one or more DC voltages. The printer 10 may also contain some type of processing circuit, such as a microprocessor or microcontroller 14, which typically has at least one address bus, one data bus, and perhaps one control bus or set of control signal lines, all generally designated by the reference numeral 20.

An EP printer 10 (e.g., a laser printer) would also contain memory elements, such as read only memory (ROM) 16 and random access memory (RAM) 18, which also would typically be in communication with an address bus and data bus, and typically connected through the buses 20 to the microprocessor or microcontroller 14.

Most printers receive print jobs from an external source, and in printer 10 there typically would be an input buffer to receive print data, usually through at least one communications port 30. In modern printers, a typical input port could be a USB port or a network ETHERNET port, but also other types of ports can be used, such as parallel ports and serial ports. The input buffer can be part of the overall system RAM 18, or it can be a separate set of memory elements or data registers, if desired.

In many modern EP printers, additional memory devices are included, such as some type of bulk memory device, or Flash memory or NVRAM-type memory devices (generally designated by the reference numeral 12). In today's technology, the semiconductor non-volatile memory devices typically are constructed of electrically-erasable programmable read only memory (EEPROM) devices. The bulk memory device 12 could comprise a hard disk drive, or perhaps an optical drive that has read/write capabilities.

When a print job arrives at the input buffer, it is passed to a raster image processor (RIP) stage, typically using firmware at reference numeral 40 on FIG. 1. In many modern printers, the RIP stage is physically comprised of an application specific integrated circuit (ASIC). The print job is typically divided into individual pages, and any rasterizing that may need to be performed will occur at this RIP stage. Once the print job has been divided into individual bitmaps that represent pages, the print data is then sent to a print engine controller, which is part of a physical print engine at reference numeral 50. It will be understood that, in many modern EP printers, an entire page of bitmap data is not necessarily available in its final rasterized form at the moment when the first scanline of bitmap data is sent to the print engine controller for that same page.

From a control function standpoint, the print data will first arrive at raster image processor 40, and then be sent to the print engine controller at 50. In many printers (including conventional laser printers), there is a separate ASIC for controlling the print raster imaging process and a separate ASIC for controlling the print engine. In many newer printers, the ASICs have become powerful enough that all of the elements that make up the rasterizer (image processor) and the print engine controller can be placed into a single ASIC package. The processing circuit and memory circuit elements may, or may not, be resident on the ASIC. The exact hardware configuration of these circuit components is not of critical importance in the present invention.

As noted above, the print engine controller will control a physical print engine 50, which will typically include a photosensitive image-forming device, such as a photoconductive drum or a photoconductive belt. Such a photoconductive element (e.g., a cylindrical drum) receives modulated laser light on a surface area that becomes an image-forming region, thus forming a latent image on this surface by virtue of the modulated laser light discharging certain areas of the photoconductive element. This latent image will attract an image-forming material such as toner, and the image-forming material is then transferred to some type of print media. The physical output from the print engine 50 is a sheet of the print media (e.g., paper), generally designated by the reference numeral 60 on FIG. 1.

The print engine controller typically controls ail of the mechanical devices of a standard EP or laser print engine 50. In most sheet printers, there is at least one input paper tray (not shown) and, when needed, the print engine 50 actuates the input paper tray, and causes it to send a sheet of print media to the print engine 50, whereupon it is printed with toner. When the print engine 50 is finished with this particular sheet, the printed sheet 60 is typically sent to an output paper tray, depicted on FIG. 1 by a "hard copy output" box. A toner cartridge (not shown) contains a supply of toner material; in many laser printers, the toner cartridge (or multiple cartridges for many color laser printers) is removable, and can be replaced with a new toner cartridge that contains a fresh supply of toner.

It should be noted that much of the control logic needed for controlling the functions of the printing process and the sheet media movements of a printer can be off-loaded to a physically separate processing circuit, or to a virtual processing device. For example, a host computer could send appropriate command signals directly to output switching devices (e.g., transistors or triacs) that reside on the printer main body; the host computer could also directly receive input signals from various sensors on the printer main body, to facilitate the control logic that is resident on such a host computer. Thus the control logic (or a portion thereof) of a printing device need not always be part of the physical printer, but may be resident in another physical device, or perhaps be virtual. In reference to FIG. 1, the microprocessor 14 may not have to reside within the printer 10, but instead could be replaced by a set of electrical or optical command signal-carrying and data signal-carrying pathways (e.g., a set of parallel electrical conductors or fiber optic channels).

It should be noted that the host computer discussed above could either be a personal computer (PC) that is directly connected to printer 10 (e.g., via a USB cable or a parallel-port cable), or it could be a personal computer that is connected through a network before its commands arrive at printer 10. Such a host computer could be the computer 100, depicted on FIG. 1, connected through the network 70.

Another important software function of printer 10 is a "watermark function" 42, which could also reside in firmware, ROM, or in bulk storage on printer 10. In the present invention, the watermark function 42 can allow a prismatic design to be embedded in the firmware 40 of printer 10. As discussed below, the prismatic design can become an important part of the background of a secure document, particularly a document that requires a "copy-resistant background" pattern. These types of documents are typically used as print media for personal checks, cashier's checks, and other types of monetary transaction papers, as well as for other important documents, such as stock certificates.

FIG. 1 also includes a personal computer 100, which includes a processing circuit, such as a microprocessor or microcontroller 114, which typically has at least one address bus, data bus, and perhaps a control bus or set of control signal lines, all generally designated by the reference numeral 120. Computer 100 also contains memory elements, such as ROM 116 and RAM 118, which also would typically be in communication with an address bus and data bus, and typically connected through the buses 120 to the microprocessor or microcontroller 114.

Computer 100 will also typically contain a bulk memory storage device 112, such as a hard disk drive or a read/write optical disk drive, or perhaps some newer type of bulk storage memory device yet to be developed. Computer 100 will also contain one or more input/output ports (or communication ports) 130, which will allow it to communicate with other devices. In FIG. 1, the communication ports 130 are connected to the network 70. One of the communication ports 130 could also be directly connected to a printer, such as the printer 10, if desired.

Certain software will be stored or otherwise made available to the computer 100 for the purposes of the present invention. An image design software package will be used in the present invention, and is generally designated by the reference numeral 140. In addition, when working with a physical printer or other type of image-forming device, most personal computers will include a printer driver program, such as the printer driver 142 depicted on FIG. 1. Modern printer drivers can do many things with a physical printer, including sending non-rasterized print jobs that will later be rasterized at the printer itself, for example. However, in many modern printing systems, the printer driver 142 that is resident on a network computer such as the computer 100 will have the printer driver perform the actual rasterization, and will then send the print job in a rasterized bitmap form to the physical printing device; this data stream could be compressed or encrypted, if desired. This could be either through a direct connection to the physical printer, or through a network, such as the network 70 that is also connected to the printer 10 in FIG. 1.

Another network component in FIG. 1 is a network server, generally designated by the reference numeral 150. For the present invention, network server 150 preferably is also a "secure server," for reasons that are discussed below. Some of the documents that can be printed using the principles of the present invention are considered highly secure documents by most organizations, and when such documents are stored in memory, those same organizations would typically want those documents stored on a "secure server."

The network server 150 would typically include some type of processing circuit, such as a microprocessor or microcontroller 160. Such processors typically have at least one address bus, data bus, and perhaps a control bus or set of control signal lines, all generally designated by the reference numeral 166 on FIG. 1. The network server 150 would typically contain a very large bulk storage device 162, which can be a hard disk drive, an optical drive that has read/write capabilities, a tape drive, and/or perhaps some other type of large memory storage device that has yet to be developed.

Network server 150 also contains one or more communication ports 164, which allows the network server to receive data and to transmit data to other devices. In FIG. 1, the server 150 is connected to the network 70, which is typical for a device referred to as a "network server."

Network server 150 can also include certain operating software, such as a database manager program 170, and various types of disk-operating systems that control hard disk drives or optical disk drives. In addition, network server 150 may also include a networked version of a printer driver, generally designated by the reference numeral 172 on FIG. 1. Printer driver 172 could be the equivalent of the printer driver 142 that operates on the computer 100, although the printer driver 172, being resident on the network server 150, would typically allow more than one network computer to operate with various files to generate print jobs to one or more physical printers on the same network. In the present invention, both printer driver 142 and a possible printer driver 172 will have special functions, as discussed below.

Figure 2:
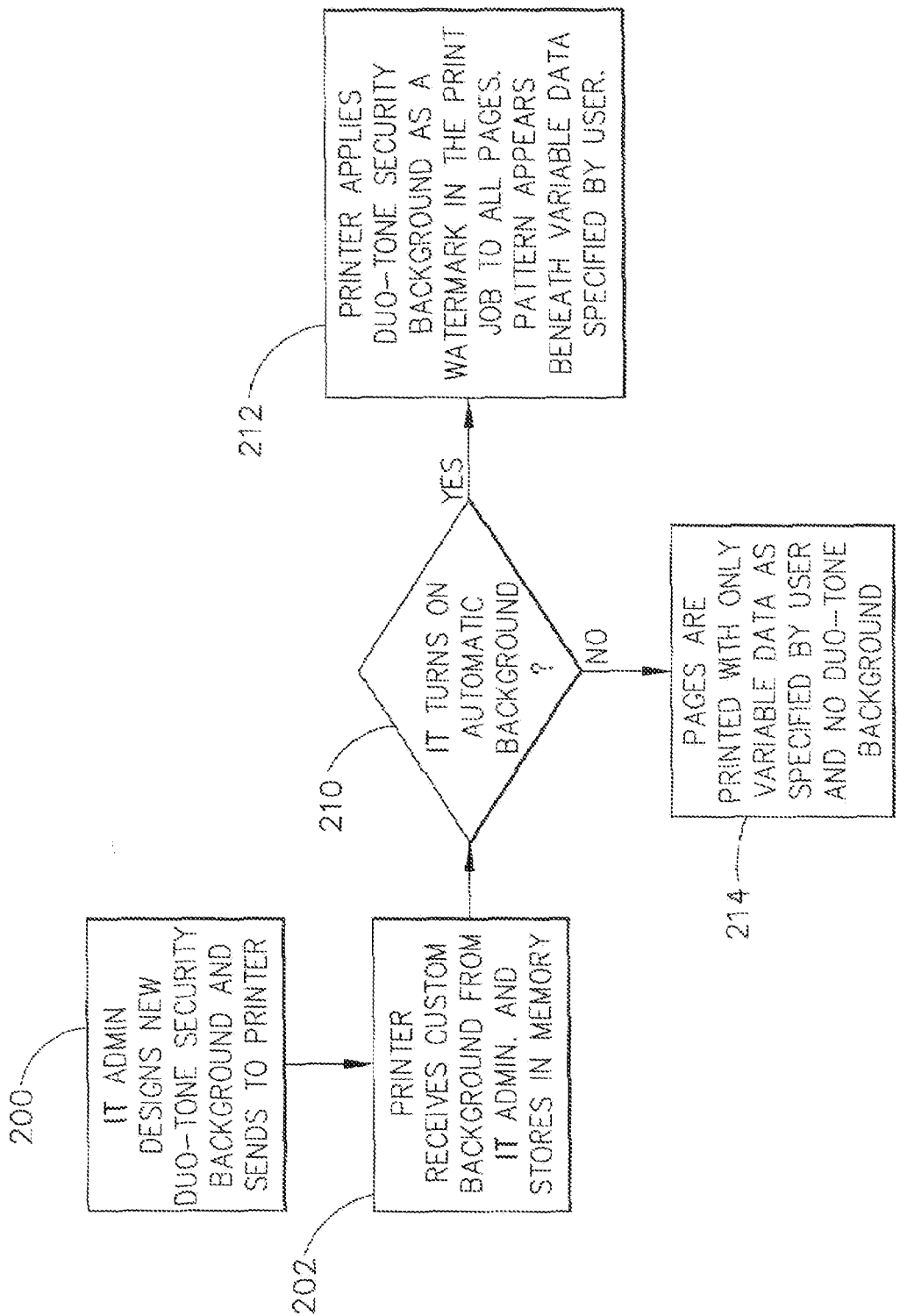
FIG. 2 is a flow chart showing steps in which the printer automatically applies a custom background to all pages, using the printer of FIG. 1.

Referring now to FIG. 2, a flow chart is provided showing use of the present invention to implement a copy resistant duo-tone secure background printing process. In this flow chart, the printer can automatically apply a custom background to all pages of the print job. Beginning at a step 200, an information technology (IT) administrator designs a new duo-tone security background and has it sent to the printer. In step 200, the IT administrator could be using the PC 10 of FIG. 1 over the network 70, and the custom designed security background could be stored in the security server 150 (or alternatively, in the memory of the administrator's PC 10).

At a step 202, the printer receives the custom background from the IT administrator and stores it in memory. With regard to FIG. 1, the printer 10 would store the custom background in either its RAM 18 or its storage device 12. This could depend on the amount of RAM memory available to printer 10 and of course upon the size of the image file used for this custom background. Alternatively, the custom background could be embedded in the printer's firmware.

A decision step 210 now allows the IT administrator to turn on the automatic background feature or not. If this feature has not been turned on, the logic flow is directed to a step 214 in which the pages are printed only with the variable data as specified by a user, and those pages would not include the duo-tone background.

On the other hand, if the automatic background feature was turned on at decision step 210, then the logic flow is directed to a step 212 in which the printer applies the duo-tone security background (e.g., using a watermark function) to all pages of the print job. This duo-tone pattern appears beneath the variable data that was specified by the user, and this will occur automatically due to the special features of the present invention.

When using the flow chart of FIG. 2, the background colors and/or patterns can be changed as often as desired for increased security. Embedded messages that either appear or disappear when copied can be changed by use of this special feature. In this fashion, the IT administrator enables the user to print variable (foreground) data as part of a print job that also includes an automatic background that has a duo-tone security feature, and this is printed on "plain paper" as the print media (i.e., "blank print media"). Instead of having to purchase, store, and account for special pre-printed paper that has the duo-tone patterns already printed thereon before ever arriving at the user's printer. A large disadvantage of the conventional system is that the pre-printed paper must be accounted for every step of the way, and if the printer is also supposed to be able to print "regular" print jobs, then the duo-tone pre-printed paper must be removed for those print jobs, while still being accounted for in a secure manner.

Figure 3:
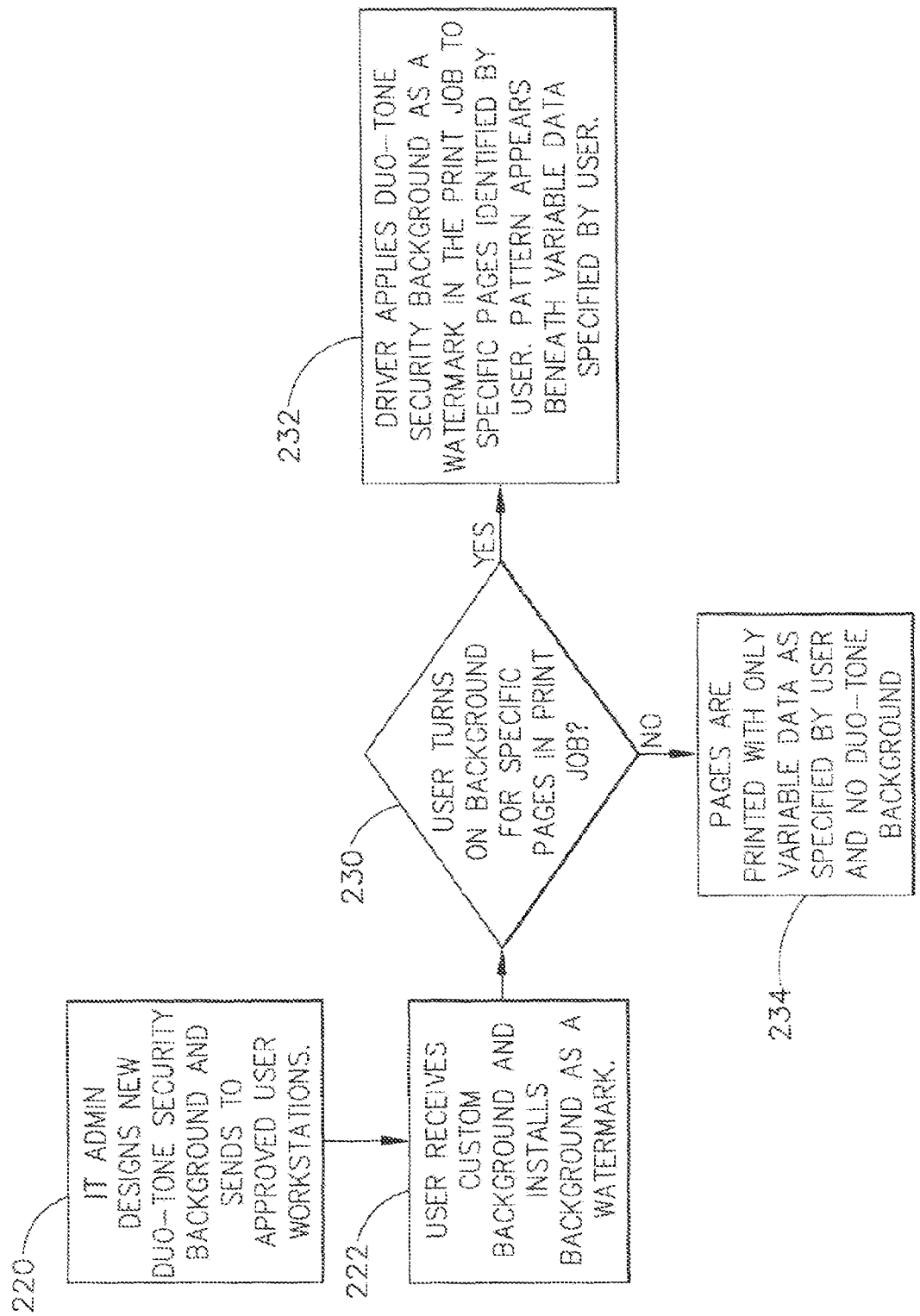
FIG. 3 is a flow chart showing steps in which the approved custom background is applied only to specific desired pages, under the control of a user, using the printer of FIG. 1.

Referring now to FIG. 3, another feature of the present invention can apply a copy resistant duo-tone secure background to "plain paper" (or blank print media) and the user can select only specific pages for that custom background. Beginning with a step 220, the IT administrator designs a new duo-tone security background and sends it (or otherwise makes it available) to approved user workstations. This typically would be through a network, such as the network 70 of FIG. 1. An option of step 220 is for the IT administrator to "send" the new duo-tone security background only to the secure server 150, and then enable only certain approved risers to access the secure server for this particular duo-tone security background feature.

A step 222 now allows the user to receive the custom background and to install this background (e.g., as a watermark) on the printer that is going to be used for this particular print job. It will be understood that a "watermark function" is a standard function on many modern EP printers, and in the case of modern printers solid by Lexmark International Inc., the watermark function will allow a prismatic duo-tone design to be embedded in the printer's firmware, such as the firmware 40 of the printer 10 in FIG. 1. Once it is in the printer's firmware, the user will have "easy" access to that image file referred to herein as the watermark.

A decision step 230 now allows the user to turn the background on for only specific pages of the print job. If a page does not have the background turned on, then the logic flow is directed to a step 234 in which that particular page is printed with only the variable data that was specified by the user, and no duo-tone background will appear on those particular pages.

On the other hand, for the specific pages that have been selected by the user, the logic flow will be directed to a step 232 in which the printer driver in the printer's firmware 40 applies the duo-tone security background (as a watermark) in the print job to those specific pages identified by the user. Again, this background is applied using the watermark function 42 of the printer 10 of FIG. 1. The duo-tone pattern will appear as a security background "beneath" the variable data that was specified by the user.

An important feature of the flow chart of FIG. 3 is that the background colors or patterns can be changed and enabled for only certain authorized users, or for departments of a company or of a government agency, for example. Therefore, only those approved (authorized) users will have access to the security pattern that will consist of this background set of colors or patterns. An embedded message could include an employee number which appears when the original printout is copied. Therefore, using this feature, any copies that happen to be made could be traced back to the original user who printed the document. This is another security feature of the present invention, and can be used to trace documents (or their copies) back to an individual person (e.g., a user or an administrator), a company or other type of organization, a government entity, or a single department of a company, organization, or government entity, in which each of these examples could have a different copy-resistant pattern that can later be recognized.

Figure 4:
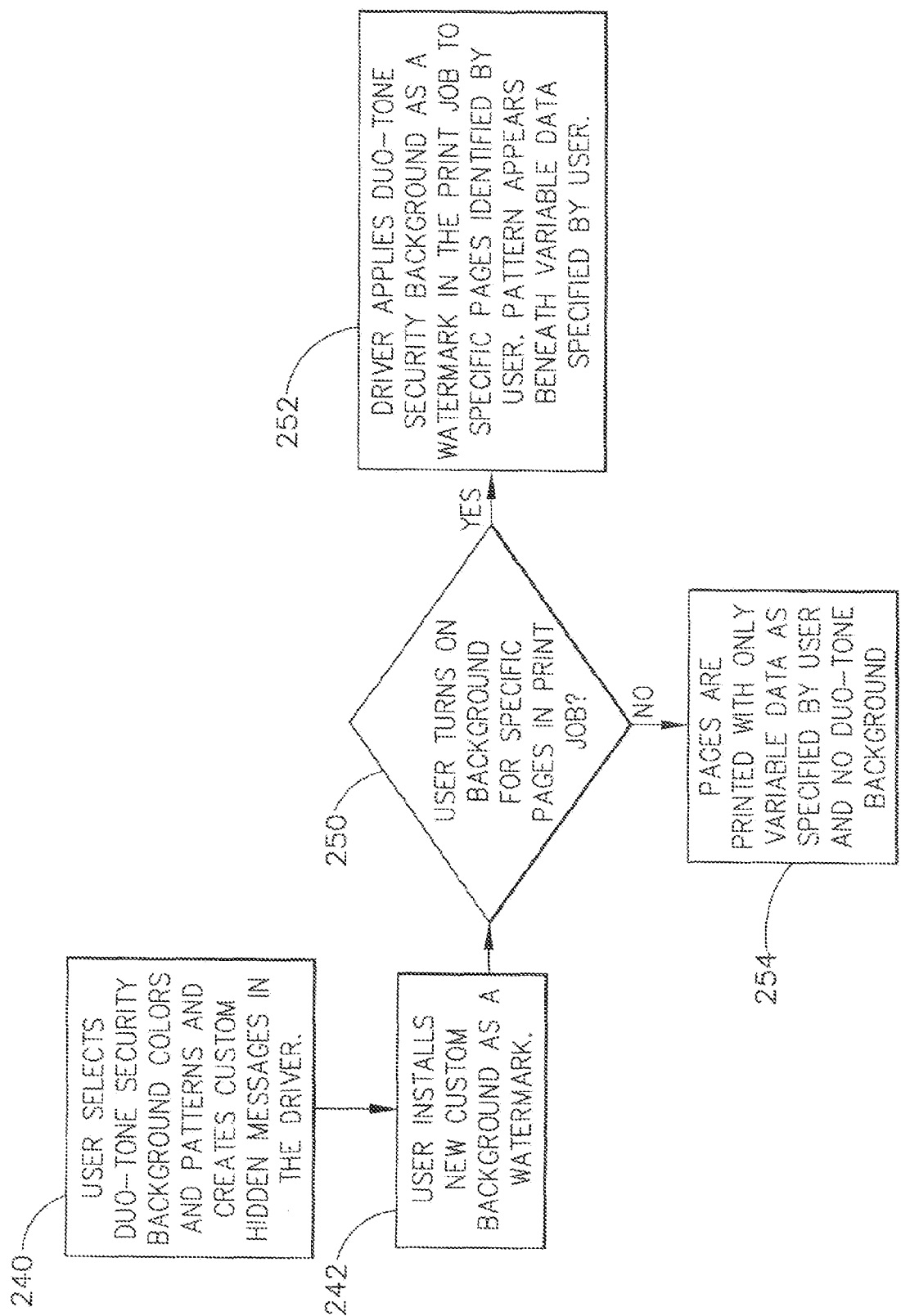
FIG. 4 is a flow chart showing steps for an individual custom background to be applied only to specific desired pages of a print job, using the printer of FIG. 1.

Referring now to FIG. 4, the present invention can be used with a feature that allows a copy resistant duo-tone secure background printing process to be applied to only specific desired pages, and moreover, a custom background can be created for each individual (authorized) user. Beginning at a step 240, a user selects or creates a duo-tone security background set of colors and patterns to create a custom hidden message, using the printer driver program of the present invention. In a step 242, the user installs the new custom background as a watermark, using the watermark function 42 of printer 10 (in FIG. 1). By using this feature of FIG. 4, the IT administrator does not need to be involved.

At a decision step 250, the user can turn on the background for specific pages in the print job. If a particular page is not to have the special background, then the logic flow is directed to a step 254 and the pages so selected are printed only with the variable data that was specified by the user, and there will be no duo-tone background on that particular page (or pages). On the other hand, if the user selects the special background for a particular page then the logic flow is directed to a step 252, and the printer driver applies the duo-tone security background as a watermark to those specific pages in the print job that were identified by the user. This special background appears "beneath" the variable data that was specified by the user.

By use of this special feature in the flow chart of FIG. 4, the user, instead of the IT administrator, can specify colors, patterns, or messages using the printer driver program. This printer driver program could be the driver 142 in a PC 100 (of FIG. 1), or perhaps could be the networked printer driver 172 of the secure server 150 (of FIG. 1). Of course, the firmware 40 and the watermark function 42 of the particular printer that is going to produce the combined foreground and specialized background must be ready for such duo-tone patterns to be used with the watermark function of the printer 10.

This special feature allows users to identity specific projects, or perhaps specific business areas, where original documents need to be accounted for. This type of security feature can be used not only in financial transactions, but also for types of secure or "secret" documents that are used by the government, or perhaps by the military, for example.

Figure 5:
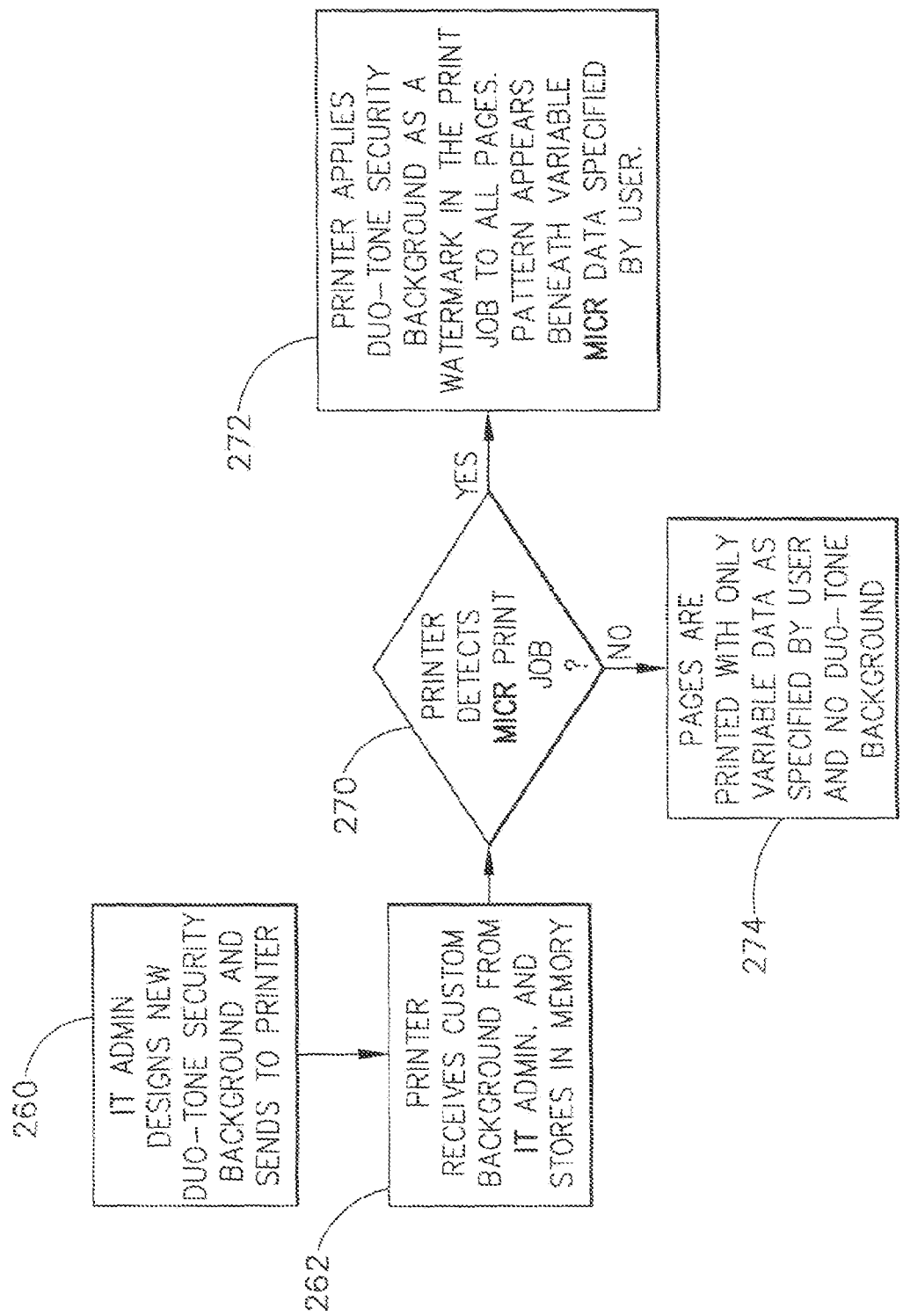
FIG. 5 is a flow chart showing steps for a custom duo-tone security background to be combined with MICR check printing, using the printer of FIG. 1.

Referring now to FIG. 5, the present invention can be used with a copy resistant duo-tone secure background printing process that combines the custom duo-tone security background with MICR check printing. Beginning at a step 260, an IT administrator designs a new duo-tone security background and sends it to a printer. As discussed above in reference to FIG. 2, the specialized security background could be stored at an intermediate point at a secure server 150, for example, instead of being directly sent to a printer. This is an option that can be decided later by a system designer at a particular financial institution, for example.

At a step 262, the printer receives the custom background from the IT administrator (or from the secure server) and stores it in the printers memory. This can be temporarily stored in the printer's RAM 18, or perhaps in a larger or bulk storage device 12, if desired or if needed due to the size of the file being received. (Or it can be embedded in the printer's firmware 40.)

At a decision step 270, the printer will determine whether or not this print job is a MICR-type print job. If not, the logic flow is directed to a step 274 and the pages are printed with only the variable data that was specified by the user, and will have no duo-tone background on those particular sheets of print media.

On the other hand, if this is a MICR print job, then a step 272 causes the printer to apply the duo-tone security background as a watermark to the pages of this print job. The specialized custom background (e.g., as a duo-tone pattern) will appear "beneath" the variable MICR data that was specified by the user.

This feature in FIG. 5 of the present invention allows "on-demand" variable data MICR check printing, which is likely to be a common application of the present invention. Many MICR check printing systems in the prior art use offset-printed blank security paper which includes the copy resistant duo-tone backgrounds, and uses monochrome laser printers for the variable MICR data. Using the present invention, a single color laser printer can simultaneously apply both the specialized background and the MICR variable data in a single step, also while using "plain paper" as the print media. Once again, this eliminates the otherwise required process of purchasing, storing, and then accounting for secure blank check security paper.

Figure 6:
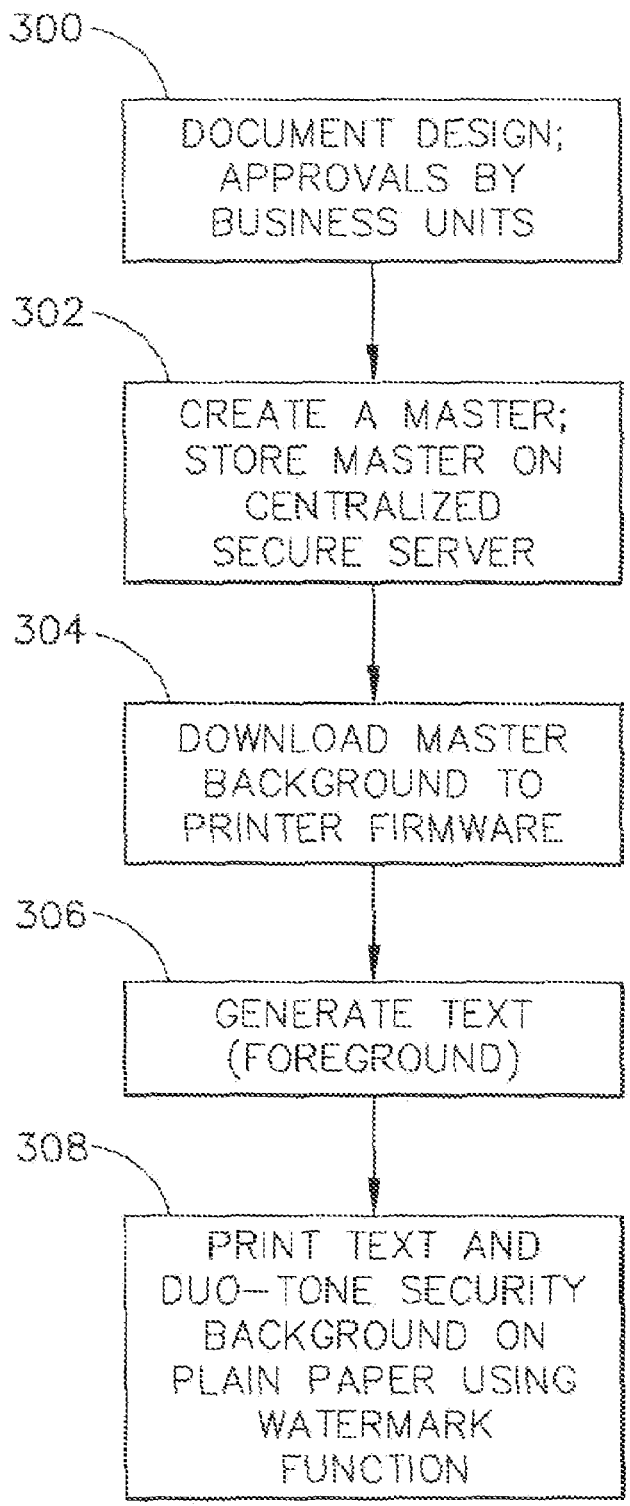
FIG. 6 is a flow chart showing the overall general steps of the present invention, which can be applied to other flow charts of FIGS. 2-5.
Figure 7:
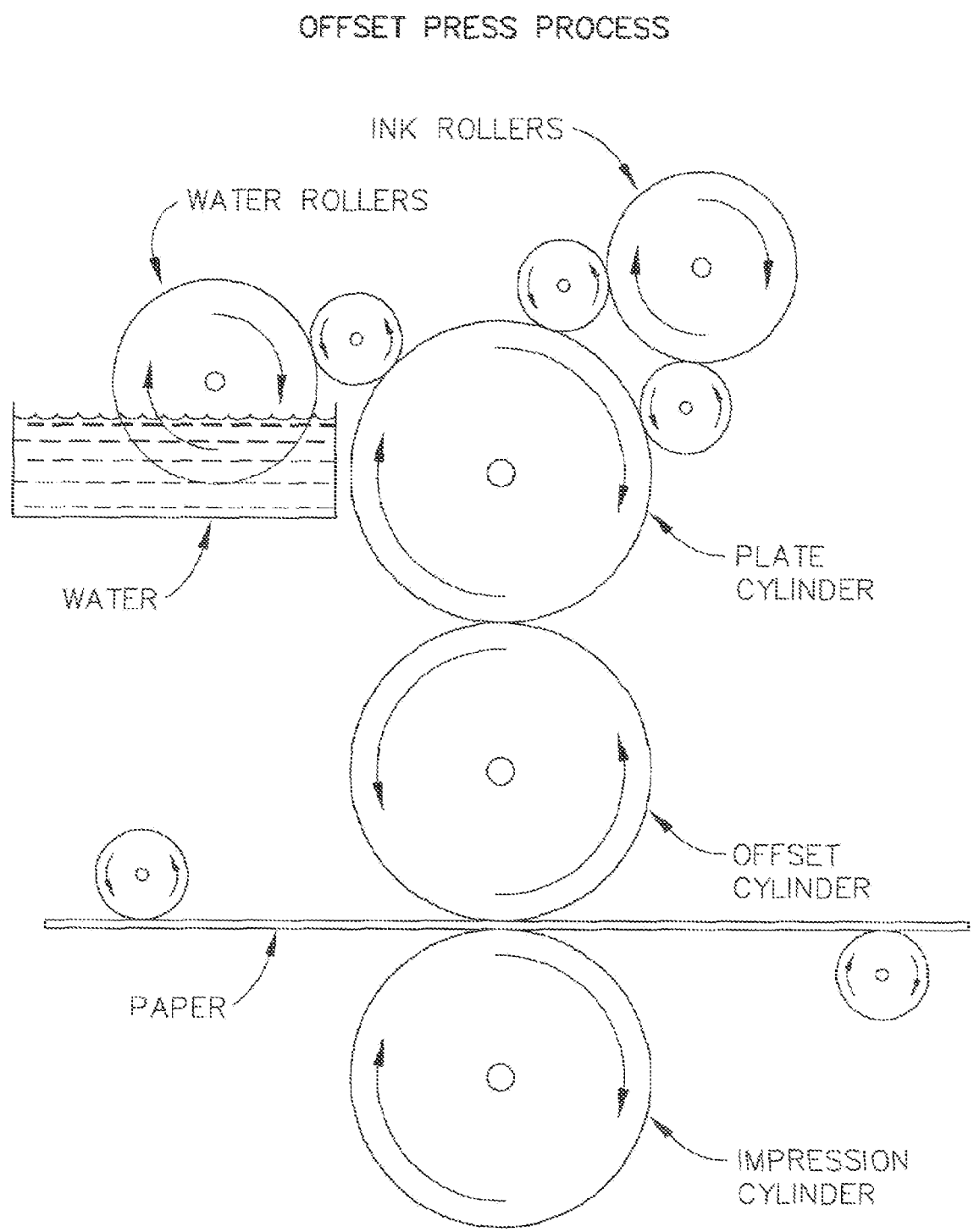
FIG. 7 is a diagrammatic view of an offset printing process used in the prior art for creating "security paper" that has a duo-tone pattern, such as used for blank checks.

Now that the flow charts of FIGS. 2-5 have been discussed, a more general flow chart showing features of the present invention is provided in FIG. 6. Beginning with a step 300, a document is designed and approved by one or more business units. This document design can be used as a specialized form that will allow specific data (as foreground data) that is different for each particular sheet of print media. On the other hand, the document design can include a specific copy-resistant background pattern, and this pattern can comprise a duo-tone prismatic pattern that will not allow a copier to be "faked out" if an unscrupulous person tries to make a copy of the original document. It is this copy-resistant background that is one of the core features of the present invention. Once the background design has been approved, a "master" is created at a step 302. This master can be stored on a centralized secure server, such as the network server 150 of FIG. 1. As discussed above, only certain authorized persons or departments would have access to this master once it has been placed in the storage memory 162 of the secure server 150.

To use this master, a step 304 downloads the master background to printer firmware. This printer firmware is at reference numeral 40 of the printer 10 on FIG. 1. This downloading can be under the control of a user at a computer 100, and this could be under control of a special printer driver 142 at this computer 100; or it could be under the control of a networked printer driver 172 of the secure server 150. This option can be decided by the system designer, or by the IT administrator of this user's system.

The text is now generated by a user at a step 306. In general, this text will be considered the "foreground" of the document, and for printing checks, for example, this will include the MICR data. The final step at 308 will print the text and the duo-tone security background on plain paper using the watermark function 42 of the printer 10, which was described in greater detail above.

It will be understood that the present invention does not necessarily have to use the watermark function of a printer, but a specialized software program could be provided to a printer (in firmware, for example) that allows a duo-tone prismatic design to be created as a background for a document, and then for that data to be merged with text or other type of "foreground" information. This feature would combine two different image files into a single combined image file, and then this combined image file could be printed by a color laser printer, for example, in a single print job for a particular sheet of print media.

It will also be understood that the principles of the present invention are basically directed to color printers, although a monochrome printer could be designed with a prismatic background design, although it would not be a "duo-tone" background. Most color printers use three "process colors," which are typically cyan, magenta, and yellow. Many such color printers also include a pure black color, either as toner (e.g., for a laser printer) or ink (e.g., for an inkjet printer). However, for MICR data, the black toner will typically have magnetic particles in it, so that the magnetic image character recognition (MICR) feature will operate successfully when reading checks. In such printers, the four colors often do not include yellow, but instead use both pure black and MICR black. The cyan and magenta typically are the other two colors of such a four-color printer.

The flow chart of FIG. 6 is in contrast with traditional secure paper sourcing processes. In a traditional setting, the custom design for a document is created, and then approved by one or more business units. A master is then created, and the proofs are then approved. The master is then sent to a centralized printing location, typically an external printing shop. This would be somewhat outside the control of the original owner of the master design. Once the printing takes place, the sheet media (or roll media, if desired) must then be shipped to the originating customer. Security is a concern, because this media should not be lost or stolen, or there could be dangerous ramifications. Even after the special media has been received by the customer, it must still be stored in a secure manner, and large volumes of such media typically must be inventoried on a periodic basis. If some of the media goes missing, the process will typically start over and existing stock typically is disposed of. The present invention eliminates most of these steps, including all of the steps of accounting for and storing the secure paper, because "blank" paper is used at the beginning of the process. For the present invention, "plain paper" can be stored, and will only become a secure document as the user-defined specialized text is printed while the duo-tone patterns are simultaneously printed on that same plain paper.

When using the present invention to create a copy-resistant background, a duo-tone pattern will be typically be used. When making such duo-tone patterns, the master document for this pattern can use double-pel dots or triple-pel dots, if desired, which work very well for creating prismatic duo-tone patterns. Some of the most modern Lexmark laser printers can also create single-pel dots in many different locations across a page to create such a specialized duo-tone pattern. All of these features can be used with modern Lexmark laser printers, and the prismatic duo-tone pattern will print very accurately with reliability. Ink jet printing could also be used, but this probably will be less desirable, unless waterproof color inks can be used, or are created in the future for such ink jet printers.

When creating the specialized background design, the pattern is sized for the media that will be used, and typically it will be copied into the watermark function of the printer driver. As discussed above, when the watermark is enabled, this specialized pattern will be printed "underneath" the variable text of the document, and plain paper can be used to create the copy-resistant documents, essentially on demand. Since conventional "security paper" does not need to be stored (because plain paper cart be used), the present invention provides a much lower cost methodology to create secure documents, and it can be easily applied to documents that otherwise might not have rated specialized paper in the past, due to their cost. Therefore, the present invention enables enhanced security for an entire company or for a government agency, as desired.

The present invention can include a specialized software program to create an Integrated tool in the printer driver to allow a customer to create custom prismatic duo-tone designs. This feature further enhances document security, since specific designs for a company, department, person, or even a single printer could be created, and original documents can then be authenticated back to specific sources. This is not typically going to happen using the prior art system of pre-printing specialized duo-tone "blank" paper. By allowing single pass print processing, the present invention allows for greater security of printing both the foreground and copy-resistant background information at the same time at a single printer, using a single print job.

It will be understood that the term "print media" herein refers to a sheet or roll of material that has toner or some other "printable" material applied thereto by a print engine, such as that found in a laser printer, or other type of electrophotographic (EP) printer. Alternatively, the print media represents a sheet or roll of material that has ink or some other "printable" material applied thereto by a print engine or printhead, such as that found in an ink let printer, or which is applied by another type of printing apparatus that projects a solid or liquefied substance of one or more colors from nozzles or the like onto the sheet or roll of material. Print media is sometimes referred to as "print medium," and both terms have the same meaning with regard to the present invention, although the term print media is typically used in this patent document. Print media can represent a sheet or roll of plain paper, bond paper, transparent film (often used to make overhead slides, for example), or any other type of printable sheet or roll material in the present invention, "plain paper" (or "blank paper") can be used to advantage to print "security documents," whereas prior conventional systems that printed "security documents" have required special "security paper" to be used in such print jobs.

Print media that is "blank" or "plain," as discussed herein, comprises print media that has no discernable markings thereon, so that its "background" appears essentially as a uniform plain color, such as white or off-white, which includes standard xerographic copy paper. Such blank or plain print media does not already have a pre-determined visible copy-resistant background printed thereon, and does not have a prismatic pattern as either a monocolor or a duo-tone color pattern. The present invention is designed to work with "blank" print media (or "plain" print media), although it would be possible for the present invention to work with other print media that might have a visible pattern of relatively "soft" colors, or a situation in which a visible pattern was made by gradual color transitions; the inventor contemplates possible use of the present invention on such print media that does not actually appear to be "blank" or "plain," and those types of print media fall within the meaning of blank print media, as used in the claims herein. Of course, it is more economical to use "true" blank copy paper in the present invention, but it is not an absolute requirement.

It will also be understood that the term "print job" comprises a set of data that is sent to a printing apparatus from art external device, such as a personal computer, or from a network computer via a network server. In the present invention, both the foreground data and the background data are printed during a single "printing event" (which may also be referred to as a single "print job" or a single "prim processing operation"). However, this does not necessarily mean that the foreground data and the background data are both actually received in the same incoming data message that arrives from the external device; to the contrary, the predetermined background data could have been previously stored in the printer's memory circuit, i.e., "embedded" in its memory. In that situation, the print job message from the external device could merely comprise the foreground print data plus a special code that instructs the printer to use a particular embedded background that had been stored there earlier. Such embedded backgrounds could be placed in the printer by a systems administrator, or possibly by an authorized user, for example: furthermore, more than one embedded background pattern could be stored at the same time in a single printer, if desired.

It will be further understood that the foreground data and the background data are both printed on the blank print media during a single "printing event" (or a single "print processing operation"), and that this occurs in "real time." The term "real time" means that the print media does not have its "background" image pre-printed by an offset printing press, and then loaded into the printer's input paper tray so the foreground data can then be printed thereon. Instead, the term "real time" means that the print media has both the foreground data and the background data printed on the print media during a printing operation that occurs during a single event which extends over a single time interval; such time interval might be several seconds, or even minutes for some older color laser printers. But it will be understood that all colors of the printed "foreground image" and the printed "background image" are not necessarily applied simultaneously; in fact, most color laser (or EP) printers use multiple print stations, one per individual color, and each of these multiple print stations typically place toner of a single color onto a transfer belt (or on a roller) as the belt (or roller) moves through a continuous motion, and that all of the multiple colors are eventually placed onto the belt/roller at the proper positions before the image is "fixed," typically by a baser device. Nevertheless, this multi-stage process is still occurring is "real time" during a single "printing event," "print job," or "print processing operation." (Note that ink jet printers typically apply all four colors simultaneously, albeit at different locations on the print media.)

Finally, the present invention could be used in a mode in which the copy-resistant background is applied to the print media in a first printing pass through the printer, and sent to the output tray, then loaded again into the input tray; then the same print media could be used again so that the (user-determined) foreground image data is then applied over the previously-printed background image. This is not a preferred mode of the present invention, but it nevertheless is an improvement over buying (and securely storing) pre-printed forms from an offset press printer. And this would be considered, a single "printing event" that occurs in real time, since the (honest) user of that printer will typically be wanting to print the copy-resistant background on only the exact number of sheets of print media that he or she needs for printing the foreground image data; otherwise he or she would be right back into the mode of securely storing print media that has already been printed with the copy-resistant background.

It will be understood that the terms "user-defined print data" represents text documents, images, and computer-generated graphics that a user creates on his or her computer. This information is under the user's control, such as a bank teller instructing his or her "teller computer" to print a cashier's check for $1,000.00 for a banking customer. In the present invention, this type of information is generally considered to be "foreground data," whereas the specialized copy-resistant image used on the cashier's cheek, for example, is generally considered to be the "background data."

It will also be understood that the logical operations described in relation to the flow charts of FIGS. 2-6 can be implemented using sequential logic, such as by using microprocessor technology, or using a logic state machine, or perhaps by discrete logic: it even could be implemented using parallel processors. One preferred embodiment may use a microprocessor or microcontroller (e.g., microprocessor 14) to execute software instructions that are stored in memory cells within an ASIC. In fact, the entire microprocessor 14 (or a microcontroller for that matter), along with RAM and executable ROM, may be contained within a single ASIC, in one mode of the present invention. Of course, other types of circuitry could be used to implement these logical operations depicted in the drawings without departing from the principles of the present invention.

It will be further understood that the precise logical operations depicted in the flow charts of FIGS. 2-6, and discussed above, could be somewhat modified to perform similar, although not exact, functions without departing from the principles of the present invention. The exact nature of some of the decision steps and other commands in these flow charts are directed toward specific future models of printer systems (those involving Lexmark laser/EP printers, for example) and certainly similar, but somewhat different, steps would be taken for use with other models or brands of laser/EP printing systems in many instances, with the overall inventive results being the same.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiments), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. An image forming apparatus, comprising:
   an input/output circuit; an interface circuit; a print media input device, a print engine that applies image-forming material to print media at an image-forming station, and an output pathway that directs said print media to an output area; wherein:
   (a) said input/output circuit receives a print job that contains digital image data;
   (b) said interface circuit contains input and output devices that are configured: (i) to move a sheet of print media from said print media input device to said print engine which applies said image-forming material to a surface of said sheet at said image-forming station; and (ii) to move said sheet through said output pathway;
   (c) said digital image data includes, for specific sheets of blank print media for said print job, both:
      (i) user-defined print data as foreground data, and
      (ii) predetermined copy-resistant background data, the copy-resistant background data including an image design; and
   (d) said print engine applies, to said at least one sheet of blank print media, both said foreground data and said background data during the same print job in real time.

2. The image forming apparatus as recited in claim 1, further comprising a processing circuit that communicates signals to and from said interface circuit, and to and from said print engine; and a memory circuit that stores data used by said processing circuit; and
   wherein said processing circuit is physically located at one of: (a) said image forming apparatus, and (b) a separate computing apparatus.

3. The image forming apparatus as recited in claim 1, wherein said predetermined copy-resistant background data comprises a custom duo-tone prismatic design, and said print engine comprises a plurality of color image-forming stations.

4. An image forming apparatus, comprising:
   an input/output circuit; a print media interface circuit; a print media input device;
   a print engine that applies image-forming material to print media at an image-forming station; an output pathway that directs said print media to an output area; a processing circuit that communicates signals to and from said interface circuit, and to and from said print engine; and a memory circuit that stores data used by said processing circuit; wherein:
(a) said input/output circuit receives a print job that contains digital image data;
(b) said print media interface circuit moves said print media from said print media input device to said print engine, and after passing through said print engine, moves said print media through said output pathway;
(c) said print engine, according to said digital image data, applies said image-forming material to a surface of said print media at said image-forming station;
(d) said processing circuit is configured to provide data signals to said print engine, including said digital image data, wherein said digital image data includes both:
 (i) user-defined print data as foreground data, and
 (ii) predetermined copy-resistant background data, the copy-resistant background data including an image design used for specific sheets of said print job; and
(e) said print engine applies both said foreground data and said background data during the same print job in real time.

5. The image forming apparatus as recited in claim 4, wherein said print media comprises one of:
(a) a roll of blank paper; and
(b) at least one sheet of blank paper.

6. The image forming apparatus as recited in claim 4, wherein said predetermined copy-resistant background data comprises a duo-tone prismatic design, and said print engine comprises a plurality of color image-forming stations.

7. The image forming apparatus as recited in claim 4, wherein if said print media with the predetermined copy-resistant background data is copied, the appearance of the background of the resulting copy is visually altered.

8. The image forming apparatus as recited in claim 4, wherein said image design is determined by at least one of:
(a) an administrator of said image forming apparatus, and said specific sheets of said print job are identified by a user;
(b) an authorized user, and said specific sheets of said print job are identified by said authorized user, and which image design is able to identify said authorized user;
(c) an administrator of said image forming apparatus, and said image design includes MICR (magnetic image character recognition) data; and
(d) an image design that is determined by an authorized user of said image forming apparatus, and said image design includes MICR (magnetic image character recognition) data.

9. The image forming apparatus as recited in claim 4, further comprising: a computer network; an external computer having a user interface; and a network server having a memory device for storing at least one set of copy-resistant background digital image data in a secure manner.

10. The image forming apparatus as recited in claim 4, wherein said predetermined copy-resistant background data is embedded in firmware of said image forming apparatus.

11. The image forming apparatus as recited in claim 4, wherein said predetermined copy-resistant background data is generated in said image forming apparatus using a watermark function.

12. A method for printing a copy-resistant print media, said method comprising:
(a) providing an image forming apparatus having a print engine that applies image-forming material to blank print media;
(b) creating predetermined copy-resistant background data, the copy-resistant background data including an image design used for specific sheets of said blank print media;
(c) creating user-defined foreground data; and
(d) causing said image forming apparatus to operate, wherein said copy-resistant background data and said user-defined foreground data are combined into a single print processing operation that is printed in real time on said blank print media, which thereby becomes copy-resistant print media.

13. The method as recited in claim 12, wherein said copy-resistant background data comprises a custom duo-tone prismatic design, and said print engine comprises a plurality of color image-forming stations.

14. The method as recited in claim 12, wherein said copy-resistant background data is determined by at least one of:
(a) an administrator and said image design is used only for said specific sheets of said print job identified by a user;
(b) an authorized user and said image design is used only for said specific sheets of said print job identified by said authorized user;
(c) an administrator and said image design includes MICR (magnetic image character recognition) data; and
(d) an authorized user and said image design includes MICR (magnetic image character recognition) data.

15. The method as recited in claim 14, wherein predetermined copy-resistant background data is later used to identify at least one of: (a) said administrator; (b) said authorized user; (c) a department of an organization; (d) an organization; and (e) a government entity.

16. The method as recited in claim 12, wherein said user-defined foreground data comprises at least one of: (a) alphanumeric text; (b) non-alphanumeric font characters; (c) images; and (d) computer-generated graphics.

17. The method as recited in claim 12, wherein said blank print media comprises one of:
(a) a roll of blank paper; and
(b) at least one sheet of blank paper.

18. The method as recited in claim 12, further comprising:
(e) providing at least one external computer for use by an administrator, or a user, or both;
(f) providing a computer network, to which said image forming apparatus and said at least one external computer are in communication therewith;
(g) providing a secure network server, which is in communication with said computer network; and
(h) after said step of creating predetermined copy-resistant background data, storing said predetermined copy-resistant background data at said secure network server for use later by an authorized user.

19. A method for creating a plurality of copy-resistant printed documents, using blank print media, said method comprising:
(a) providing blank print media that is not stored in a secure location;
(b) providing a printing apparatus, and loading it with said blank print media;
(c) creating predetermined copy-resistant background data, the copy-resistant background data including an image design used for specific sheets of a print job;
(d) creating user-defined foreground data; and
(e) sending said print job to said printing apparatus, wherein said copy-resistant background data and said user-defined foreground data are combined into a single print processing operation and printed in real time during a single printing event, which thereby produces at least one sheet of said print media that is copy-resistant.

20. The method as recited in claim 19, wherein said copy-resistant background data comprises a custom duo-tone prismatic design, and said printing apparatus comprises a plurality of color image-forming stations.

21. The method as recited in claim 19, wherein said copy-resistant background data is determined by at least one of:
 (a) an administrator and said image design is used only for said specific sheets of said print job identified by a user;
 (b) an authorized user and said image design is used only for said specific sheets of said print job identified by said authorized user;
 (c) an administrator and said image design includes MICR (magnetic image character recognition) data; and
 (d) an authorized user and said image design includes MICR (magnetic image character recognition) data.

22. The method as recited in claim 21, wherein predetermined copy-resistant background data is later used to identify at least one of: (a) said administrator; (b) said authorized user; (c) a department of an organization; (d) an organization; and (e) a government entity.

23. The method as recited in claim 19, wherein said user-defined foreground data comprises at least one of: (a) alphanumeric text; (b) non-alphanumeric font characters; (c) images; and (d) computer-generated graphics.

24. The method as recited in claim 19, wherein said blank print media comprises one of:
 (a) a roll of blank paper; and
 (b) at least one sheet of blank paper.

25. The method as recited in claim 19, further comprising:
 (e) providing at least one external computer for use by an administrator, or a user, or both;
 (f) providing a computer network, to which said printing apparatus and said at least one external computer are in communication therewith;
 (g) providing a secure network server, which is in communication with said computer network; and
 (h) after said step of creating predetermined copy-resistant background data, storing said predetermined copy-resistant background data at said secure network server for use later by an authorized user.

* * * * *